United States Patent
Smyers et al.

(10) Patent No.: US 6,952,826 B1
(45) Date of Patent: Oct. 4, 2005

(54) METHOD FOR IMPLEMENTING A MULTI-LEVEL SYSTEM MODEL FOR DETERMINISTICALLY HANDLING SELECTED DATA

(75) Inventors: Scott D. Smyers, San Jose, CA (US); Bruce A. Fairman, Woodside, CA (US); Glen D. Stone, Los Gatos, CA (US); Harold A. Ludtke, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 665 days.

(21) Appl. No.: 09/691,879

(22) Filed: Oct. 18, 2000

Related U.S. Application Data

(60) Provisional application No. 60/161,219, filed on Oct. 21, 1999, provisional application No. 60/161,206, filed on Oct. 21, 1999.

(51) Int. Cl.[7] .............................................. G06F 9/46
(52) U.S. Cl. ..................... 718/102; 718/103; 718/104; 718/107; 370/503; 713/400
(58) Field of Search ............................... 718/102, 103, 718/104, 107, 100, 108; 370/503, 226, 466, 370/216, 505, 235, 405; 713/400; 709/205, 709/250, 226; 357/357

(56) References Cited

U.S. PATENT DOCUMENTS

| | | | | |
|---|---|---|---|---|
| 5,509,037 A | * | 4/1996 | Buckner et al. | 375/371 |
| 5,692,022 A | * | 11/1997 | Haulin et al. | 375/357 |
| 5,712,845 A | * | 1/1998 | Peltomaki | 370/226 |
| 5,758,105 A | | 5/1998 | Kelley et al. | 395/293 |
| 5,808,607 A | * | 9/1998 | Brady et al. | 345/756 |
| 5,812,844 A | | 9/1998 | Jones et al. | 395/674 |
| 5,815,504 A | * | 9/1998 | Doi | 370/503 |
| 5,940,456 A | * | 8/1999 | Chen et al. | 375/356 |
| 5,961,585 A | | 10/1999 | Hamlin | 709/108 |

(Continued)

FOREIGN PATENT DOCUMENTS

EP 0658841 10/1994 ............. G06F 9/46

(Continued)

OTHER PUBLICATIONS

Assenmacher, Breitbach, Buhler, Hubsch, Peine, & Schwarz, "Parallel Programming In Panda", pp1-pp10, XP002170752.

(Continued)

Primary Examiner—Meng-Al T. An
Assistant Examiner—Lilian Vo
(74) Attorney, Agent, or Firm—Gregory J. Koerner; Redwood Patent Law

(57) ABSTRACT

A method for implementing a multi-level system model for deterministically handling selected data comprises a picokernel module that invokes an isochronous scheduler to select, schedule, and execute active isochronous processes on an electronic device in response to a cycle start signal from an isochronous clock. The active isochronous processes may selectively set plesiochronous flags to thereby designate corresponding plesiochronous processes as active plesiochronous processes. Once all active isochronous processes have been executed in a given isochronous cycle, then the picokernel may invoke a plesiochronous scheduler to select, schedule, and execute any active plesiochronous processes on the electronic device.

16 Claims, 10 Drawing Sheets

U.S. PATENT DOCUMENTS

| | | | | |
|---|---|---|---|---|
| 5,968,115 | A * | 10/1999 | Trout | 718/107 |
| 6,169,725 | B1 * | 1/2001 | Gibbs et al. | 370/216 |
| 6,202,164 | B1 * | 3/2001 | Gulick | 713/400 |
| 6,470,033 | B1 * | 10/2002 | Menzi et al. | 370/505 |
| 6,496,864 | B1 * | 12/2002 | McCartney | 709/226 |
| 6,502,123 | B1 * | 12/2002 | Gulick | 718/102 |
| 6,510,163 | B1 * | 1/2003 | Won | 370/466 |
| 6,523,058 | B1 * | 2/2003 | Fung et al. | 718/100 |
| 6,549,951 | B1 * | 4/2003 | Hui et al. | 709/250 |
| 6,591,290 | B1 * | 7/2003 | Clarisse et al. | 709/205 |
| 6,621,794 | B1 * | 9/2003 | Heikkinen et al. | 370/235 |
| 6,625,743 | B1 * | 9/2003 | Gulick | 713/400 |
| 2001/0010694 | A1 * | 8/2001 | Lindsey et al. | 370/405 |
| 2002/0199060 | A1 * | 12/2002 | Peters et al. | 711/114 |
| 2003/0140172 | A1 * | 7/2003 | Woods et al. | 709/248 |

FOREIGN PATENT DOCUMENTS

| | | | | |
|---|---|---|---|---|
| WO | | 9854643 | 12/1998 | G06F 9/46 |

OTHER PUBLICATIONS

Assenmacher, Breitbach, Buhler, Hubsch, & Schwarz, "The Panda System Architecture—A Pico-Kernel Approach", Sep. 22, 1993, pp470-pp476, XP002170751.

Assenmacher, Breitbach, Buhler, Hubsch, Peine, & Schwarz, "Meeting The Application In User Space", Sep. 12, 1994, pp82-pp87, XP002170753.

Kunzman & Wetzel, "1394 High Performance Serial Bus: The Digital Interface For ATV", Aug. 1, 1995, pp893-pp900, XP000539552.

* cited by examiner

METHOD FOR IMPLEMENTING A MULTI-LEVEL SYSTEM MODEL FOR DETERMINISTICALLY HANDLING SELECTED DATA

CROSS-REFERENCE TO RELATED APPLICATIONS

This application relates to, and claims priority in, U.S. Provisional Patent Application Ser. No. 60/161,219, entitled "Method For Implementing A Multi-Level System Model For Handling Multiple Data Streams", filed on Oct. 21, 1999, and to U.S. Provisional Patent Application Ser. No. 60/161,206, entitled "Method For Implementing Scheduling Mechanisms By Utilizing Resource Characterizations," filed on Oct. 21, 1999. The foregoing related applications are commonly assigned, and are hereby incorporated by reference.

BACKGROUND SECTION

1. Field of the Invention

This invention relates generally to techniques for performing data handling operations, and relates more particularly to a method for implementing a multi-level system model for deterministically handling selected data.

2. Description of the Background Art

Implementing effective methods for handling data by electronic devices is a significant consideration for designers and manufacturers of contemporary electronic devices. An electronic device in an electronic network may advantageously communicate with other electronic devices in the network to share data to thereby substantially increase the capabilities and versatility of individual devices in the electronic network. For example, an electronic network may be implemented in a home environment to enable flexible and beneficial sharing of data and device resources between various consumer electronic devices, such as personal computers, digital versatile disc (DVD) devices, digital set-top boxes for digital broadcasting, enhanced television sets, and audio reproduction systems.

Effectively managing data handling operations in a network of electronic devices may create substantial challenges for designers of electronic networks. For example, enhanced demands for increased device functionality and performance during data transfer operations may require more system processing power and require additional hardware resources across the network. An increase in processing or hardware requirements may also result in a corresponding detrimental economic impact due to increased production costs and operational inefficiencies.

Network size is also a factor that affects data handling operations in an electronic network. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software module on the local device may need to transfer data to various remote software elements on remote devices across the electronic network. However, successfully managing a substantial number of electronic devices across a network may provide significant benefits to a system user.

Furthermore, enhanced device capability to perform various advanced data handling operations may provide additional benefits to a system user, but may also place increased demands on the control and management of the various devices in the electronic network. For example, an enhanced electronic device that effectively accesses, processes, and displays digital television programming may benefit from efficient network communication techniques because of the large amount and complexity of the digital data involved.

Due to growing demands on system resources and substantially increasing data magnitudes, it is apparent that developing new and effective techniques for handling data is a matter of importance for the related electronic technologies. Therefore, for all the foregoing reasons, implementing effective methods for handling data by electronic devices remains a significant consideration for designers, manufacturers, and users of contemporary electronic devices.

SUMMARY

In accordance with the present invention, a method is disclosed for implementing a multi-level system model for deterministically handling selected data. In one embodiment, initially, a picokernel in an electronic device preferably waits for a cycle start signal from an isochronous clock to trigger the start of an isochronous processing cycle.

In response to the cycle start signal, the picokernel preferably determines whether any isochronous processes have been instantiated and are available for immediate scheduling and execution. The picokernel may check for available isochronous processes using any appropriate technique. For example, in certain embodiments, the picokernel may analyze an isochronous process list to locate any active isochronous processes.

If one or more active isochronous processes are ready to be executed, then the picokernel may preferably invoke an isochronous process scheduler that responsively selects an active isochronous process for scheduling and execution using any effective method or technique. The isochronous process scheduler then preferably schedules and executes the selected isochronous process on the electronic device.

The foregoing isochronous process also preferably determines whether to activate a corresponding plesiochronous process by signaling the plesiochronous process by setting a corresponding plesiochronous flag. An isochronous process may utilize any appropriate criteria to determine whether to set a plesiochronous flag.

The isochronous scheduler next preferably determines whether any unexecuted active isochronous processes remain for scheduling and execution during the current isochronous cycle. If unexecuted active isochronous processes remain, then the isochronous scheduler returns to sequentially select, schedule, and execute the remaining isochronous processes.

However, if no unexecuted active isochronous processes remain, then the picokernel preferably determines whether any plesiochronous processes have been instantiated and have been flagged as being available for immediate scheduling and execution. The picokernel may check for available plesiochronous processes using any appropriate technique. For example, in certain embodiments, the picokernel may analyze a plesiochronous process list to locate any flagged plesiochronous processes. If no flagged plesiochronous processes are available for scheduling and execution, then the picokernel returns to wait for a subsequent cycle start signal from the isochronous clock.

However, if one or more flagged plesiochronous processes are available, then the picokernel may preferably invoke a plesiochronous scheduler. In response, the plesiochronous scheduler preferably selects a flagged plesiochronous process for scheduling and execution using any effective method or technique.

The picokernel also preferably monitors the electronic device for any interrupt events that may affect the plesiochronous processes. In certain embodiments, if an exochronous interrupt occurs, then the picokernel may preferably interrupt the currently executing plesiochronous process and mark the interrupted plesiochronous process for subsequent completion. The electronic device may then perform various required system tasks using exochronous processing.

Alternately, in certain embodiments, if a new cycle start signal occurs before flagged plesiochronous processes complete execution, then the picokernel may preferably interrupt the plesiochronous processes and mark the interrupted plesiochronous processes for subsequent completion. The picokernel may then preferably continue to select, schedule, and execute any active isochronous processes in a new isochronous cycle.

If no interrupt events occur, then the plesiochronous scheduler preferably may determine whether any unexecuted flagged plesiochronous processes remain for scheduling and execution during the current isochronous cycle. If unexecuted plesiochronous processes remain, then the plesiochronous scheduler preferably returns to select, schedule, and execute the remaining plesiochronous processes. However, if no unexecuted plesiochronous processes remain, then the picokernel preferably returns to repeatedly perform the foregoing steps in response to subsequent cycle start signals from the isochronous clock. The present invention therefore provides an improved method for implementing a multi-level system model for deterministically handling selected data.

DETAILED DESCRIPTION OF THE PREFERRED EMBODIMENT

The present invention relates to an improvement in electronic data handling techniques. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a method for implementing a multi-level system model for deterministically handling selected data, and includes a picokernel module that may invoke an isochronous scheduler to select, schedule, and execute active isochronous processes on an electronic device in response to a cycle start signal from an isochronous clock. The active isochronous processes may selectively set plesiochronous flags to thereby designate corresponding plesiochronous processes as active plesiochronous processes. Once all active isochronous processes have been executed in a given isochronous cycle, then the picokernel may invoke a plesiochronous scheduler to select, schedule, and execute any active plesiochronous processes on the electronic device.

Figure 1:
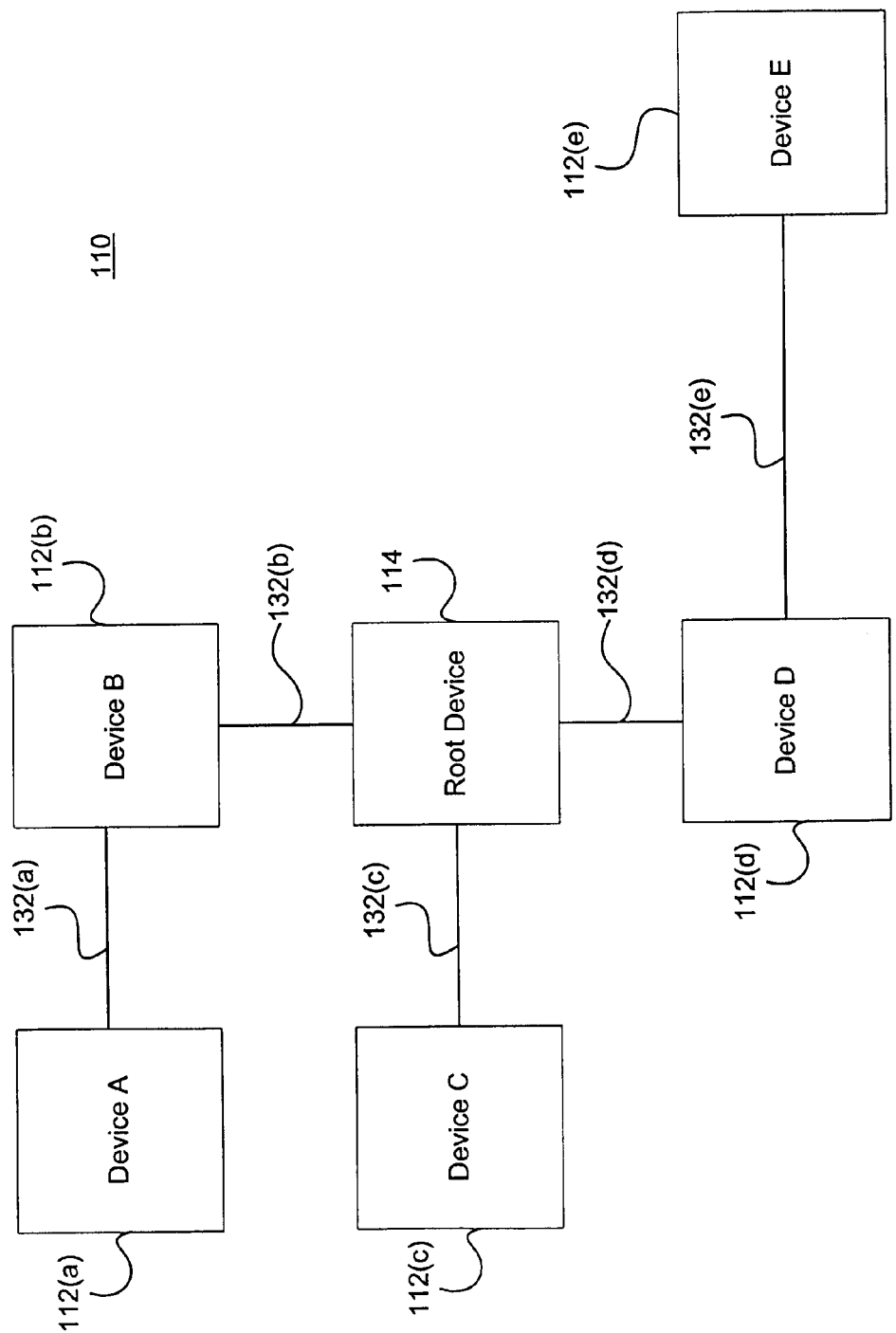
FIG. 1 is a block diagram for one embodiment of an electronic network, in accordance with the present invention.

Referring now to FIG. 1, a block diagram for one embodiment of an electronic network 110 is shown, according to the present invention. In the FIG. 1 embodiment, network 110 preferably comprises, but is not limited to, a number of electronic devices 112 (device A 112(a), device B 112(b), root device 114, device C 112(c), device D 112(d), and device E 112(e)). In alternate embodiments, electronic network 110 may readily be configured to include various other devices 112 or components that function in addition to, or instead of, those discussed in conjunction with the FIG. 1 embodiment. In alternate embodiments, network 110 may readily be connected and configured in any other appropriate and suitable manner.

In the FIG. 1 embodiment, devices 112 of network 110 may be implemented as any type of electronic device, including, but not limited to, personal computers, printers, digital video disc devices, television sets, audio systems, video cassette recorders, and set-top boxes for digital broadcasting. In the FIG. 1 embodiment, devices 112 preferably communicate with one another using a network bus 132. Network bus 132 preferably includes path 132(a), path 132(b), path 132(c), path 132(d), and path 132(e). For example, device B 112(b) is coupled to device A 112(a) via path 132(a), and to root device 114 via path 132(b). Similarly, root device 114 is coupled to device C 112(c) via path 132(c), and to device D 112(d) via path 132(d). In addition, device D 112(d) is coupled to device E 112(e) via path 132(e). In the FIG. 1 embodiment, network bus 132 is preferably implemented using a P1394 Standard for a High Performance Serial Bus, IEEE, 1995, which is hereby incorporated by reference. However, in alternate embodiments, network 110 may readily communicate and function using various other network interconnectivity schemes, which are equally within the scope of the present invention.

In the FIG. 1 embodiment, each device in electronic network 110 may preferably communicate with any other device within network 10. For example, device E 112(e) may communicate with device B 112(b) by transmitting data via cable 132(e) to device D 112(d), which then may transmit the data via cable 132(d) to root device 114. In response, root device 114 then may transmit the data to device B 112(b) via cable 132(b). In the FIG. 1 embodiment, root device 114 preferably provides a master cycle start signal to synchronize isochronous processes for devices 112 in network 110. In other embodiments of network 110, any one of the network devices 112 may be designated as the root device or cycle master.

Figure 2:
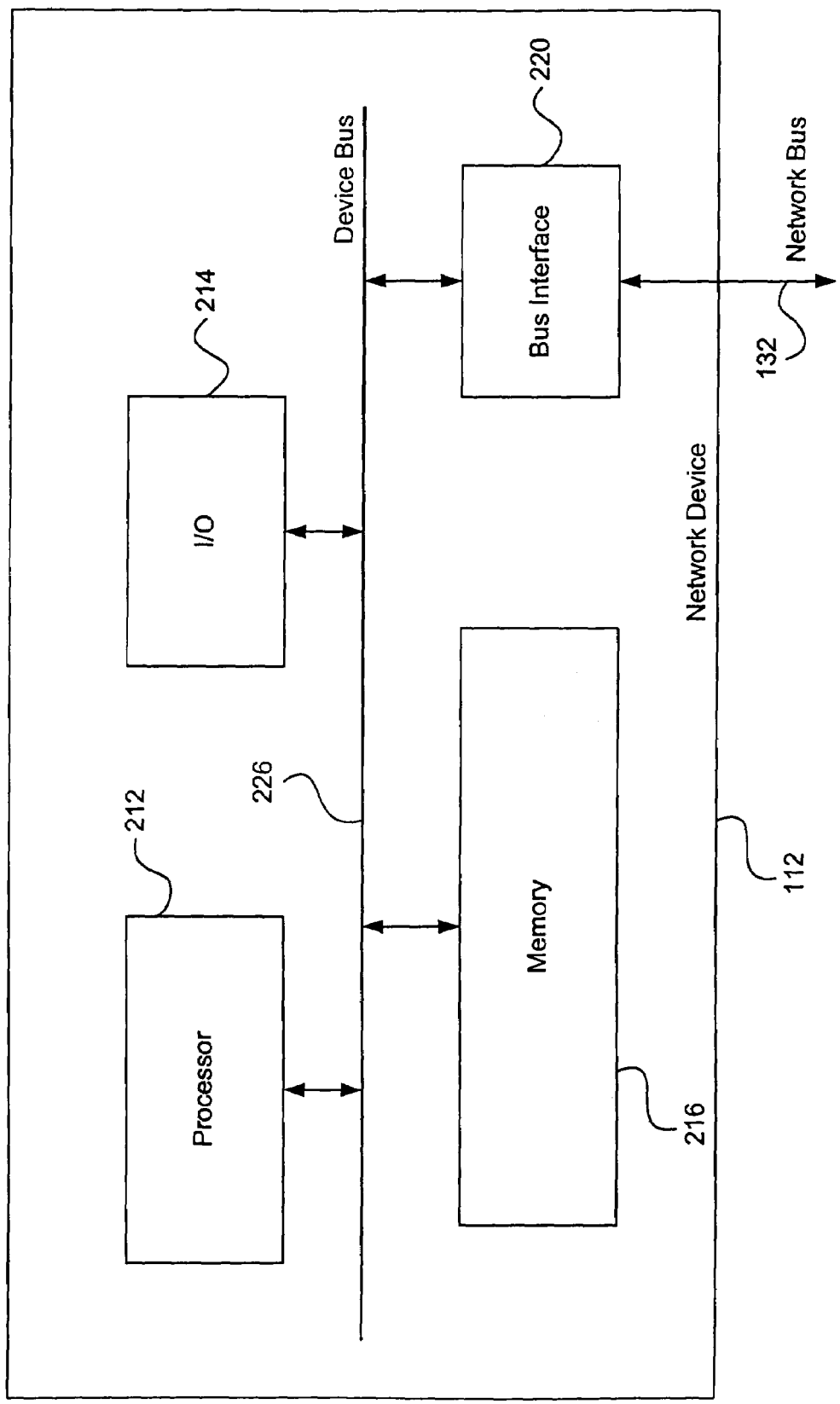
FIG. 2 is a block diagram for one embodiment of an exemplary device of FIG. 1, in accordance with the present invention.

Referring now to FIG. 2, a block diagram for one embodiment of an exemplary device 112 from network 110 is shown, in accordance with the present invention. Device 112 preferably includes, but is not limited to, a processor 212, an input/output (I/O) interface 214, a memory 216, a device bus 226, and a bus interface 220. Processor 212, I/O interface 214, memory 216 and bus interface 220 preferably are each coupled to, and communicate via common device bus 226. In alternate embodiments, device 112 may readily be configured to include various other components or architectures in addition to, or instead of, those discussed in conjunction with the FIG. 2 embodiment.

In the FIG. 2 embodiment, processor 212 may preferably be implemented as any appropriate microprocessor device. Memory 216 may preferably be implemented as one or more effective storage devices, including, but not limited to, read-only memory, random-access memory, and various types of non-volatile memory, such as floppy disc devices or hard disc devices. I/O interface 214 preferably may provide an interface for bi-directional communications with various compatible sources, destinations, and other entities.

In accordance with the present invention, bus interface 220 preferably provides a bi-directional interface between device 112 and network 110. In the FIG. 2 embodiment, bus interface 220 preferably communicates with other devices 112 on network 110 via network bus 132. Bus interface 220 also preferably communicates with processor 212, I/O device 214, and memory 216 via a common device bus 226.

Figure 3:
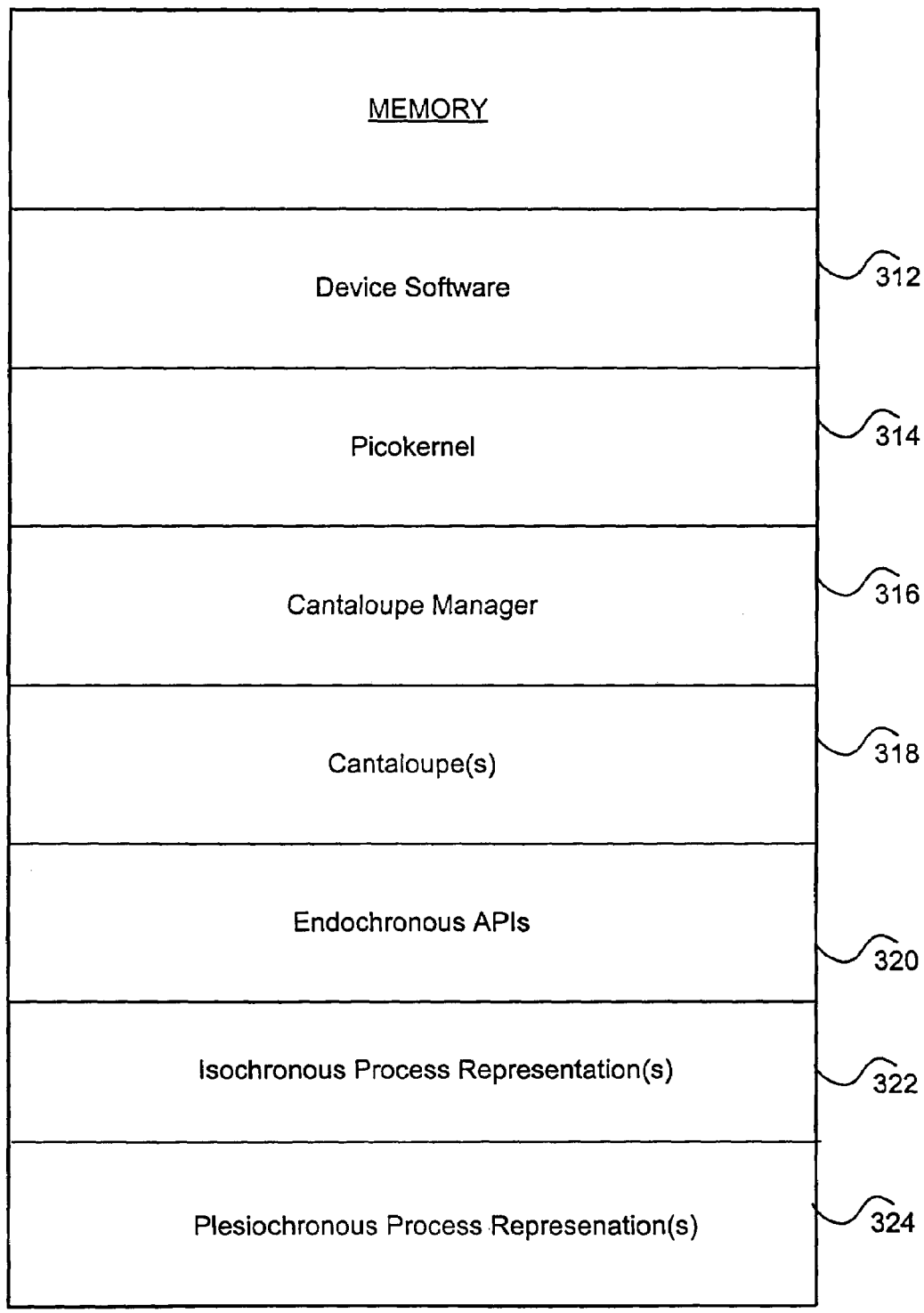
FIG. 3 is a diagram for one embodiment of the memory of FIG. 2, in accordance with the present invention.

Referring now to FIG. 3, a diagram for one embodiment of the FIG. 2 memory 216 is shown, in accordance with the present invention. In the FIG. 3 embodiment, memory 216 preferably includes, but is not limited to, device software 312, picokernel 314, cantaloupe manager 316, cantaloupe(s) 318, endochronous application program interfaces (endochronous APIs) 320, isochronous process representation(s) 322, and plesiochronous process representation(s) 324. In alternate embodiments, memory 216 may readily include various other components in addition to, or instead of, the components that are discussed in conjunction with the FIG. 3 embodiment.

In the FIG. 3 embodiment, device software 312 preferably may include software instructions that may be executed by processor 212 for performing various functions and operations by device 112. The particular nature and functionality of device software 312 preferably varies depending upon factors such as the type and purpose of the corresponding host device 112.

In the FIG. 3 embodiment, picokernel 312 preferably controls and coordinates the scheduling and execution of isochronous and plesiochronous processes by utilizing optimized process representations 322 and 324 to reduce the cost or overhead of scheduling to a minimum. Picokernel 312 is further discussed below in conjunction with FIGS. 5 and 7–10.

Cantaloupe manager 316 preferably may utilize information from cantaloupe(s) 318 to determine whether a particular isochronous or plesiochronous process may be instantiated on behalf of another entity such as device software 312. Cantaloupe(s) 318 preferably include one or more characterizations of hardware and/or software resources necessary to meet performance criteria for a particular isochronous process. Cantaloupe(s) 318 are further discussed below in conjunction with FIG. 4.

In the FIG. 3 embodiment, endochronous APIs 320 may preferably include one or more application program interfaces that allow the implementation of a programmable isochronous capability in a particular system. In certain embodiments, endochronous APIs 320 may include interfaces for installing isochronous services, interfaces to create, control, and delete endochronous processes, and interfaces to communicate with the rest of a system through a signaling mechanism.

In the FIG. 3 embodiment, isochronous process representation(s) 322 preferably include one or more data structures that each correspond to an associated isochronous process that has been instantiated on device 112. Each of the isochronous process representation(s) 322 preferably include any relevant information that is required to successfully and deterministically execute the corresponding isochronous process. Similarly, plesiochronous process representation(s) 324 preferably include one or more data structures that each correspond to an associated plesiochronous process that has been instantiated on device 112. Each of the plesiochronous process representation(s) 324 preferably include any relevant information that is required to successfully and deterministically execute the corresponding plesiochronous process.

Figure 4:
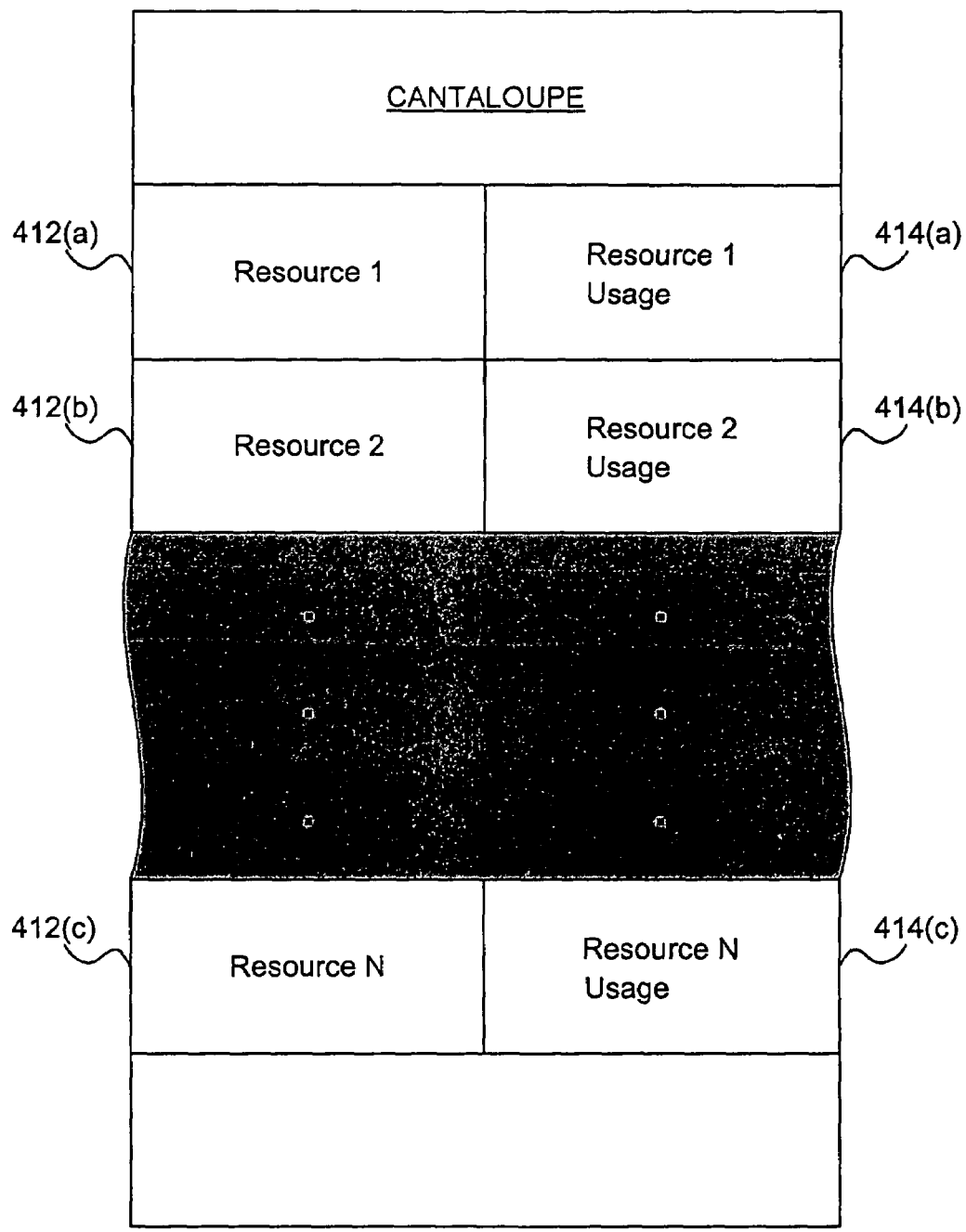
FIG. 4 is a block diagram for one embodiment of a cantaloupe from FIG. 3, in accordance with the present invention.

Referring now to FIG. 4, a diagram for one embodiment of a cantaloupe 318 is shown, in accordance with the present invention. In the FIG. 4 embodiment, cantaloupe 318 preferably includes a listing for a resource 1 (412(a)) through a listing for a resource N (412(c)). In the FIG. 4 embodiment, resources 412 may include any appropriate aspects of devices 112 or network 110 (FIG. 1). For example, resource 412 may correspond to the bandwidth for a particular bus, such as device bus 226 or network bus 132. Similarly, resource 412 may correspond to the processing capacity for a central processing device, such as processor 212 (FIG. 2). In alternate embodiments of the present invention, cantaloupe 318 may readily be implemented to include various other configurations, and may also include various items and components that are different from those discussed in conjunction with the FIG. 4 embodiment.

In accordance with the present invention, cantaloupe 318 is preferably associated with a particular isochronous or plesiochronous process on network 110. Prior to instantiating the foregoing process, cantaloupe manager 316 may then advantageously reference cantaloupe 318 to determine the individual and total resources necessary for the associated process. Determining in advance whether sufficient system resources are available for successful operation of a given process ensures that the associated isochronous process is guaranteed sufficient resources for timely and deterministic performance. Providing resources becomes more significant as the cycle duration decreases and the cycle frequency increases. In one embodiment of the present invention, the cycle period may preferably be in the proximity of 125 microseconds, with a rate of eight kilohertz.

In the FIG. 4 embodiment, cantaloupe 318 preferably also includes a listing for a resource 1 usage (414(a)) through a listing for a resource N usage (414(c)). In the FIG. 4 embodiment, each of resource usages 414 preferably corresponds with a given resource 412 to characterize the amount of the given resource 412 required by the isochronous or plesiochronous process associated with cantaloupe 318.

For example, if a given resource 412 is the bandwidth for a particular bus, then the corresponding resource usage 414 may be expressed in bandwidth units utilized by a process. Similarly, if a given resource 412 is the processing capacity for a central processing device, then corresponding resource usage 414 may be expressed in CPU units, such as machine-instructions per second (MIPS). In various embodiments of the present invention, resource usages 414 may be implemented in any appropriate and compatible format for use by network 110. In one embodiment, cantaloupe 318 may be implemented using only resource usages 414, with the corresponding resources 412 indirectly implied and understood during instantiation of process on network 110.

Therefore, cantaloupe 318 preferably includes an at least two-dimensional array of descriptive parameters. The first parameter preferably may be the type of resource being characterized, and the second parameter is the amount of required resource usage. A cantaloupe 318 may thus serve as a common descriptor to couple hardware and software scheduling mechanisms by describing resource requirements. For example, in one embodiment, resource usage may be characterized and described as a ratio of the amount of usage per a given time period (including process scheduling overhead).

Figure 5:
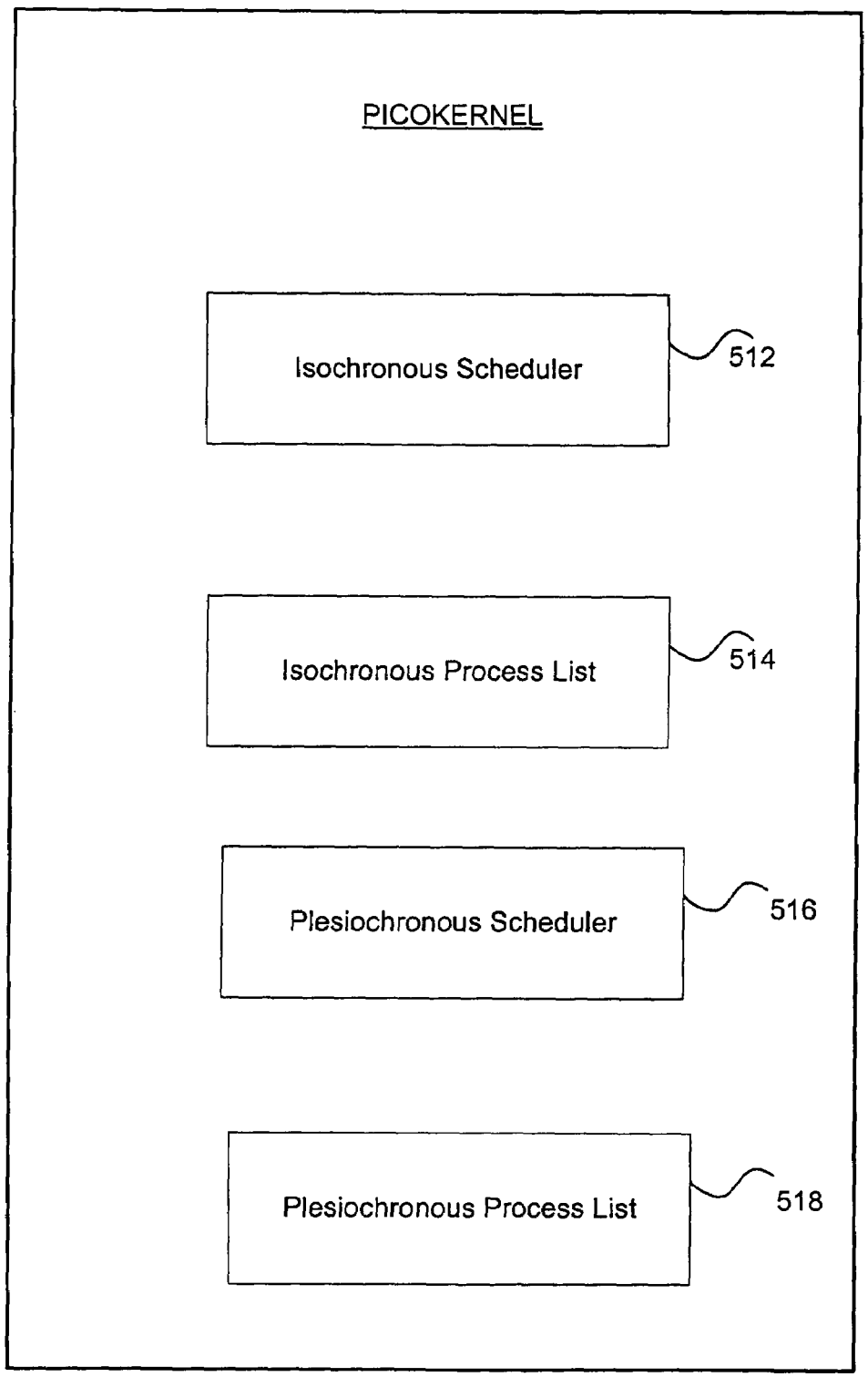
FIG. 5 is a block diagram for the picokernel of FIG. 3, in accordance with one embodiment of the present invention.

Referring now to FIG. 5, a block diagram for the FIG. 3 picokernel 314 is shown, in accordance with one embodiment of the present invention. In the FIG. 5 embodiment, picokernel 314 preferably may include, but is not limited to, an isochronous scheduler 512, an isochronous process list 514, a plesiochronous scheduler 516, and a plesiochronous process list 518. In alternate embodiments, picokernel 314 may readily be configured to include various other components or types of information in addition to, or instead of, those discussed in conjunction with the FIG. 5 embodiment.

In the FIG. 5 embodiment, isochronous scheduler 512 may preferably include program instructions for scheduling and executing various isochronous processes on device 112. Isochronous process list 514 preferably may include one or more isochronous process identifiers that each corresponds to an associated isochronous process that is currently instantiated and active on device 112. The functionality and utilization of isochronous scheduler 512 and isochronous process list 514 are further discussed below in conjunction with FIGS. 7 through 9.

In the FIG. 5 embodiment, plesiochronous scheduler 516 may preferably include program instructions for scheduling and executing various plesiochronous processes on device 112. Plesiochronous process list 518 preferably may include one or more plesiochronous process identifiers that each corresponds to an associated plesiochronous process that is currently instantiated and active on device 112. The functionality and utilization of plesiochronous scheduler 516 and plesiochronous process list 518 are further discussed below in conjunction with FIGS. 7, 8, and 10.

Figure 6:
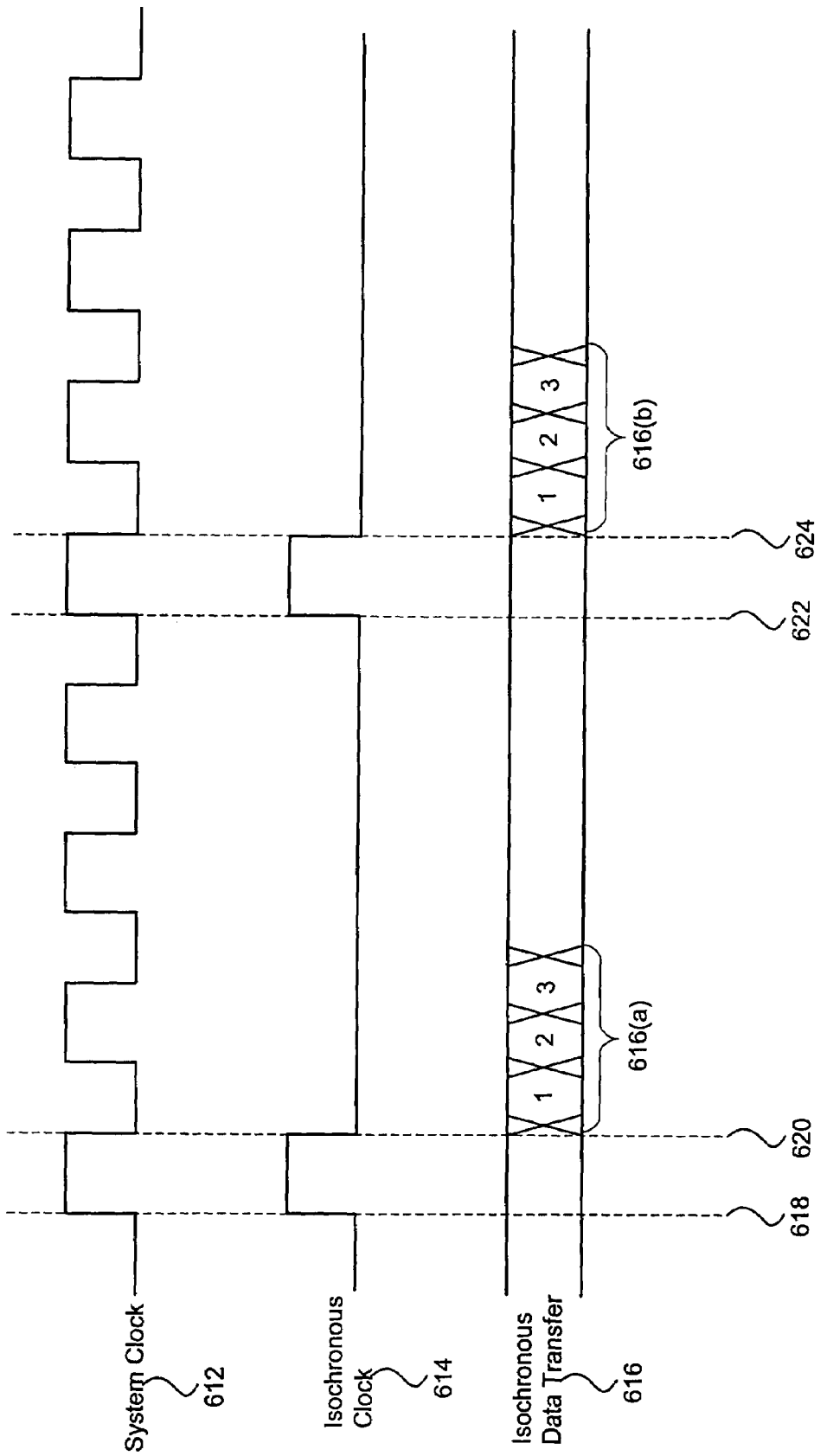
FIG. 6 is a timing diagram for one embodiment of exemplary isochronous data transfers, in accordance with the present invention.

Referring now to FIG. 6, a timing diagram for one embodiment of exemplary isochronous data transfers is shown, in accordance with the present invention. The FIG. 6 timing diagram includes a system clock 612, an isochronous clock signal 614, and an isochronous data transfer signal 616. The FIG. 6 timing diagram is presented for purposes of illustration, and in alternate embodiments, isochronous data transfers may readily be configured to include various other elements and timing relationships in addition to, or instead of, those discussed in conjunction with the FIG. 6 embodiment. For example, certain of the principles discussed below in conjunction with isochronous data transfers may similarly apply to isochronous data processing operations, plesiochronous data transfers, or plesiochronous data processing operations.

Isochronous data typically includes time-sensitive data that is preferably assigned a high transfer and processing priority to guarantee that the isochronous data deterministically arrives at a designated destination at pre-determined timing intervals and is processed accordingly. Because of the time-sensitive nature of isochronous data, re-transmission of an isochronous data transfer may not be appropriate or possible. For example, if a frame of video data does not reach a display device on network 110 until after the appropriate moment for display of that frame, then re-transmitting the delayed frame is not productive. Sources of isochronous data therefore typically do not repeat unsuccessful isochronous data transmissions. Loss of the foregoing frame of video data may likely cause unwanted jitter or breakup of the corresponding video programming. Therefore, ensuring the timely and guaranteed delivery and processing of isochronous data becomes a matter of some importance when implementing network 110.

In the FIG. 6 timing example, at time 618, a first isochronous clock pulse 614 changes state in synchronization with system clock 612. In certain situations, isochronous clock pulse 614 may also be called a cycle start signal because isochronous clock pulse 614 triggers and synchronizes the beginning of an isochronous timing cycle. At time 620, the isochronous clock pulse 614 changes state again, and isochronous data transfer 616(a) responsively occurs in a deterministic manner.

Similarly, at time 622, a second isochronous clock pulse 614 changes state in synchronization with system clock 612. At time 624, the second isochronous clock pulse 614 once more changes state, and isochronous data transfer 616(b) again occurs in a deterministic manner. Therefore, as illustrated in FIG. 6, isochronous data transfers 616(a) and 616(b) typically occur at a pre-determined frequency in device 112. Furthermore, device 112 may require isochronous data transfers 616(a) and 616(b) to occur before any asynchronous data transfers because of the time-sensitive nature of the corresponding isochronous data.

Figure 7:
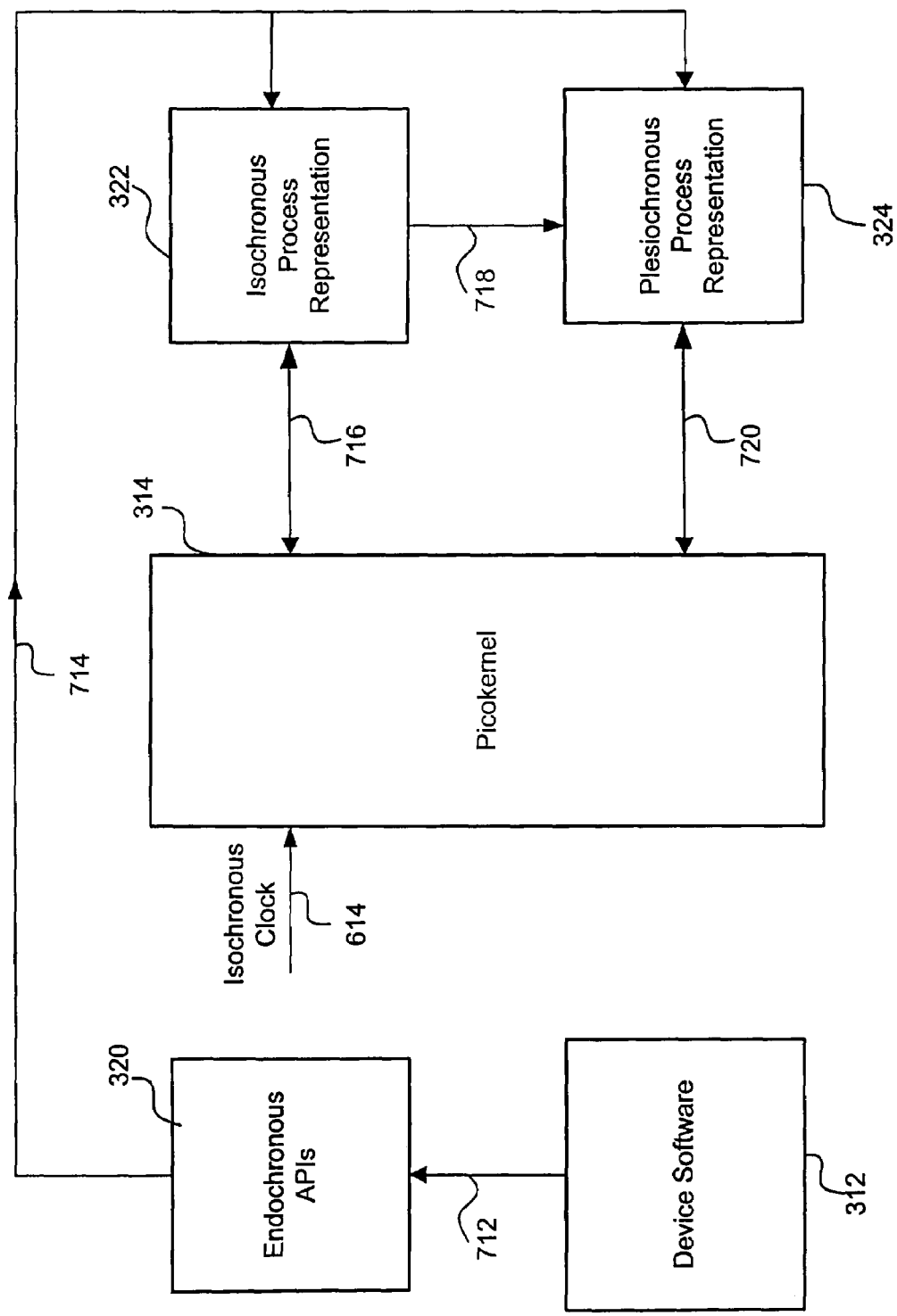
FIG. 7 is a block diagram of one embodiment for implementing a multi-level system model, in accordance with the present invention.

Referring now to FIG. 7, a block diagram of one embodiment for implementing a multi-level system model is shown, in accordance with the present invention. In alternate embodiments, multi-level system models may readily be implemented to include various other components, architectures, or functionalities in addition to, or instead of, those discussed in conjunction with the FIG. 7 embodiment.

In the FIG. 7 embodiment, initially, device software 312 may generate an isochronous request to endochronous APIs 320 via path 712 for instantiating an isochronous process (and possibly one or more corresponding plesiochronous processes) on device 112. Device software 312 may generate the isochronous request for any appropriate reason. For example, device software 312 may generate the isochronous request because of information received from a system user or other device on network 110 that specifically requires transfer or processing of corresponding isochronous data. Device software 312 may also generate the isochronous request in response to isochronous identifier information that may be detected in data packets that are transmitted to device 112.

In the FIG. 7 embodiment, in response to the isochronous request, endochronous APIs 320 preferably may perform an instantiation procedure to create isochronous process representation 322 (and possibly plesiochronous process representation 324) via path 714. The foregoing instantiation procedure preferably may include performing a device resource allocation procedure using cantaloupe(s) 318, as discussed above in conjunction with FIG. 4.

In certain embodiments, isochronous process representation 322 may notify picokernel 314 via path 716 when isochronous process representation 322 has been instantiated and is currently active on device 112. In response, picokernel 314 may add a unique isochronous process identifier for the isochronous process representation 322 to isochronous process list 514 (FIG. 5). When appropriate, isochronous process representation 322 may also generate a plesiochronous flag to plesiochronous process representation 324 via path 718 to indicate that the corresponding plesiochronous process is ready to be executed on device 112.

The plesiochronous process representation 324 may then notify picokernel 314 via path 720 that the plesiochronous process representation 322 has been instantiated and is currently ready to be executed on device 112. In response, picokernel 314 may add a unique plesiochronous process identifier for the plesiochronous process representation 324 to plesiochronous process list 518 (FIG. 5). In certain other embodiments, picokernel 314 may poll isochronous process representation 322 and plesiochronous process representation 324 to determine whether corresponding isochronous or plesiochronous processes are currently active on device 112.

In accordance with the present invention, picokernel 314 then preferably may receive a cycle start signal from isochronous clock 614, and responsively schedule and execute the isochronous process associated with isochronous process representation 322. Similarly, picokernel 314 may schedule and execute the plesiochronous process associated with plesiochronous process representation 324. The exemplary FIG. 7 embodiment is discussed in the context of a single isochronous process and a single plesiochronous process, however the present invention may readily instantiate, schedule, and execute any desired number of isochronous processes and plesiochronous processes. The utilization of picokernel 314 to schedule and execute isochronous processes and plesiochronous processes is further discussed below in conjunction with FIGS. 8 through 10.

Figure 8:
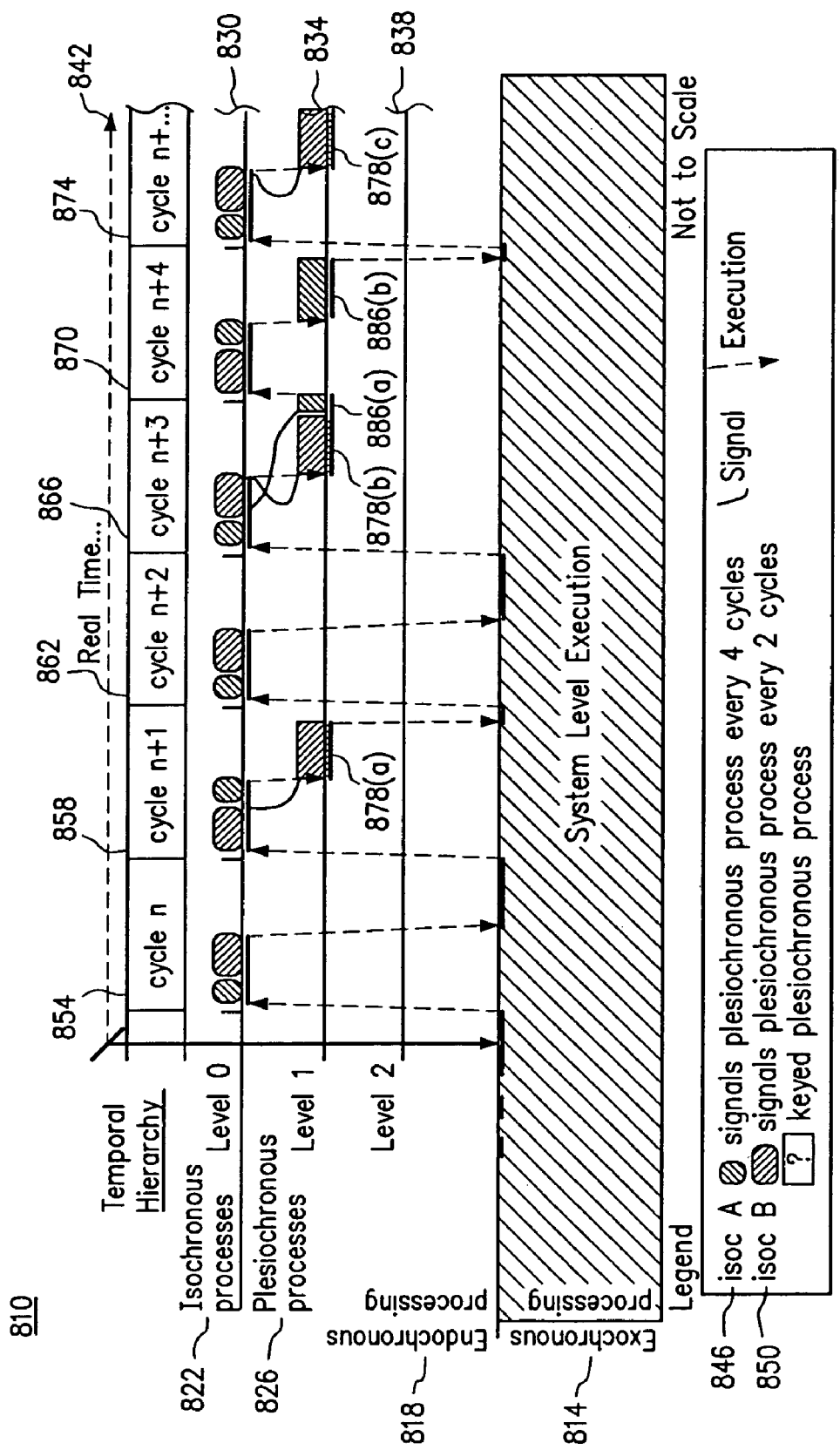
FIG. 8 is an exemplary timing diagram illustrating the operation of a multi-level system model, in accordance with one embodiment of the present invention.

Referring now to FIG. 8, an exemplary timing diagram 810 illustrating the operation of a multi-level system model is shown, in accordance with one embodiment of the present invention. The FIG. 8 embodiment is presented for purposes of illustration, and various other process execution hierarchies and timing sequences are equally contemplated for effective operation in the environment of the present invention.

In the FIG. 8 embodiment, timing diagram 810 is arranged in a temporal hierarchy that ranges from higher priority isochronous processes that are located at the top of timing diagram 810, to lower priority plesiochronous processes that are located at the bottom of timing diagram 810. The FIG. 8 embodiment includes exochronous processing 814 (system level execution) which is located in the shaded area at the bottom of timing diagram 810. The FIG. 8 embodiment also includes endochronous processing 818 which is located from immediately above exochronous processing 814 to the top of the FIG. 8 timing diagram 810.

In the FIG. 8 embodiment, endochronous processing 818 preferably may include one or more isochronous processes 822. In timing diagram 810, isochronous processes 822 are shown on level 0 (830) of endochronous processing 818. In the FIG. 8 embodiment, endochronous processing 818 preferably may also include one or more plesiochronous processes 826. In timing diagram 810, plesiochronous processes 826 are shown on level 1 (834) of endochronous processing 818. The multi-level system model of the present invention may include any desired number of different levels. For example, timing diagram 810 includes a level 2 (838) for scheduling and executing additional plesiochronous processes.

The FIG. 8 timing diagram 810 displays real time that progresses from left to right on horizontal axis 842 to include a contiguous sequence of isochronous cycles that are demarcated by periodic cycle start signals. For example, in timing diagram 810, the first "cycle n" is triggered by cycle start signal 854. Each successive isochronous cycle is similarly triggered by respective cycle start signals 858, 862, 866, 870, and 874. Timing diagram 810 also includes a reoccurring isochronous process A 846 that signals a corresponding plesiochronous process 886 every four cycles (see legend), and a reoccurring isochronous process B 850 that signals a corresponding plesiochronous process 878 every 2 cycles (see legend).

During operation of the FIG. 8 embodiment, picokernel 314 preferably receives cycle start signal 854, and responsively selects, schedules, and executes isochronous process A 846 and isochronous process B 850. In the FIG. 8 timing diagram, the outline of the various isochronous and plesiochronous processes preferably represents the bounds of allocated system resources as determined by the resource allocation procedure discussed above in conjunction with FIG. 4. In the FIG. 8 timing diagram 810, when all isochronous processes 822 and all plesiochronous processes 826 have been executed, then device 112 preferably may switch to exochronous processing 814 to perform any required system level execution tasks.

In the FIG. 8 embodiment, in response to cycle start signal 858, picokernel 314 preferably schedules and executes isochronous process B 850 (which preferably signals that plesiochronous process 878 is now ready to execute) and isochronous process A 846. Following the completion of isochronous process A 846, picokernel 314 preferably schedules and executes plesiochronous process 878(*a*). Then, at the beginning of the next isochronous cycle, picokernel 314 preferably receives cycle start signal 862, and responsively selects, schedules, and executes isochronous process A 846 and isochronous process B 850.

In the FIG. 8 embodiment, in response to cycle start signal 866, picokernel 314 preferably selects, schedules, and executes isochronous process A 846 (which preferably signals that plesiochronous process 886 is now ready to execute). Picokernel 314 also preferably selects, schedules, and executes isochronous process B 850 (which preferably signals that plesiochronous process 878 is now ready to execute). Following the completion of isochronous process B 850, picokernel 314 preferably selects, schedules, and executes plesiochronous process 878(*b*) and a first portion (886(*a*)) of plesiochronous process 886 which is interrupted because of the occurrence of cycle start signal 870.

In response to cycle start signal 870, picokernel 314 preferably selects, schedules, and executes isochronous process B 850 and isochronous process A 846. Following the completion of isochronous process A 846, picokernel 314 then preferably schedules and executes the remaining portion (886((*b*)) of plesiochronous process 886. At cycle start signal 874, picokernel 314 preferably selects, schedules, and executes isochronous process A 846 and isochronous process B 850 (which preferably signals that plesiochronous process 878 is now ready to execute).

Following the completion of isochronous process B 850, picokernel 314 preferably schedules and executes plesiochronous process 878(c). The FIG. 8 multi-level system model may thus continue to select, schedule, and execute multi-level isochronous processes and plesiochronous processes using endochronous processing 818, and also perform system level execution using exochronous processing 814.

The picokernel 314 (FIG. 3) is responsible for the scheduling of isochronous processes, and utilizes optimized process representations to reduce scheduling overhead to a minimum. Execution of an isochronous process is preferably not interruptable, and therefore the execution of isochronous processes simply runs from the start of the process until the end of the process. The uninterruptability of isochronous processes advantageously simplifies the scheduling model necessary for the operation of picokernel 314.

Scheduling of isochronous processes 822 and plesiochronous processes 826 typically requires a finite time period that is sometimes referred to as "overhead". As the cycle time period is reduced, the overhead becomes a more significant factor because of the reduced amount of time remaining to perform the actual isochronous transfer or processing. In the FIG. 8 embodiment, the cycle time period may be in the proximity of 125 microseconds, with a cycle frequency of approximately eight kilohertz.

In certain embodiments, the maximum amount of time allotted to isochronous operation may be approximately ⅘ of the cycle time period (100 microseconds). This mechanism may be implemented by cantaloupe manager 316 to guarantee that isochronous processing does not exceed a specified portion of resource usage. Therefore, an efficient and relatively rapid scheduling mechanism (picokernel 314) is required for successful isochronous processes. The utilization of cantaloupe 318 and cantaloupe manager 316 to characterize and pre-allocate the necessary resources for a particular isochronous process advantageously facilitates efficient scheduling of the isochronous processes.

In accordance with the present invention, certain plesiochronous processes can generally tolerate more latency in their scheduling, as well as less determinism in their execution. For example, a particular plesiochronous process may have a lesser degree of importance, have a relatively long duration, or require resources that are not available at the isochronous level. In certain embodiments, isochronous processes 822 may often be associated with relatively short transfers of a particular set of isochronous data, while corresponding plesiochronous processes 826 may be associated with relatively longer processing functions for the particular set of isochronous data.

In the FIG. 8 embodiment, a plesiochronous process 826 may preferably be interruptable by an isochronous process 822. In accordance with the present invention, multiple levels of plesiochronous processes 826 may be available to perform data transfers, data processing, or other functions. A plesiochronous process 826 preferably may be related to, or initiated by, a corresponding isochronous process 822 by using a simple signaling mechanism (shown in FIG. 8 as a solid line with an arrow). However, in certain embodiments, a plesiochronous process 826 need not be related to a corresponding isochronous process 822. Together, isochronous processes 822 and plesiochronous processes 826 form endochronous processing 818 because both types of processes are related to the same time domain which includes the isochronous cycle sequence illustrated in the FIG. 8 embodiment.

Isochronous processes 822 preferably are treated as the highest-priority processes. Plesiochronous processes 826 are treated as the second-highest priority processes, and are preferably scheduled after exiting from isochronous process scheduling and execution. A plesiochronous scheduler 516 (FIG. 5) preferably includes a priority scheduler (not shown) since a lengthy or infrequent plesiochronous process may not block a frequent plesiochronous process. Scheduling of isochronous processes 822 is typically driven by the occurrence of an isochronous interrupt that may interrupt system level execution 814 or a plesiochronous process 826.

As discussed above, in the FIG. 8 embodiment, scheduling operations that occur outside the cycle time domain of the isochronous and plesiochronous processes may be termed exochronous processing 814. In the FIG. 8 embodiment, the execution of various system level processes is preferably included in the foregoing exochronous processing 814. These system level processes preferably include tasks and processes from the host operating system's normal execution environment. Communication between endochronous processing 818 and exochronous processing 814 may be analogous to communication between a system interrupt handler and interrupt processing routines. Therefore, the signaling of an interrupt-like event may utilize normal system services.

The present invention thus advantageously utilizes a multiple-level system model for deterministically handling multiple streams of continuous data, where each level represents a discrete level in the hierarchy of time. Isochronous processes 822 preferably handle data movement according to an isochronous clock 614 that is synchronized to a time reference that functions as a point of global synchrony for network 110. Plesiochronous processes 826 preferably handle streaming data according to a time base which is different from, but which may be synchronous with, the isochronous data movement clock domain. The system level execution in exochronous processing 814 is preferably not controlled according the foregoing time base, and is not involved with the movement or processing of streaming data. In accordance with the present invention, the multi-level system model thus efficiently and effectively facilitates various isochronous, plesiochronous, and system level processes across electronic network 110.

Figure 9:
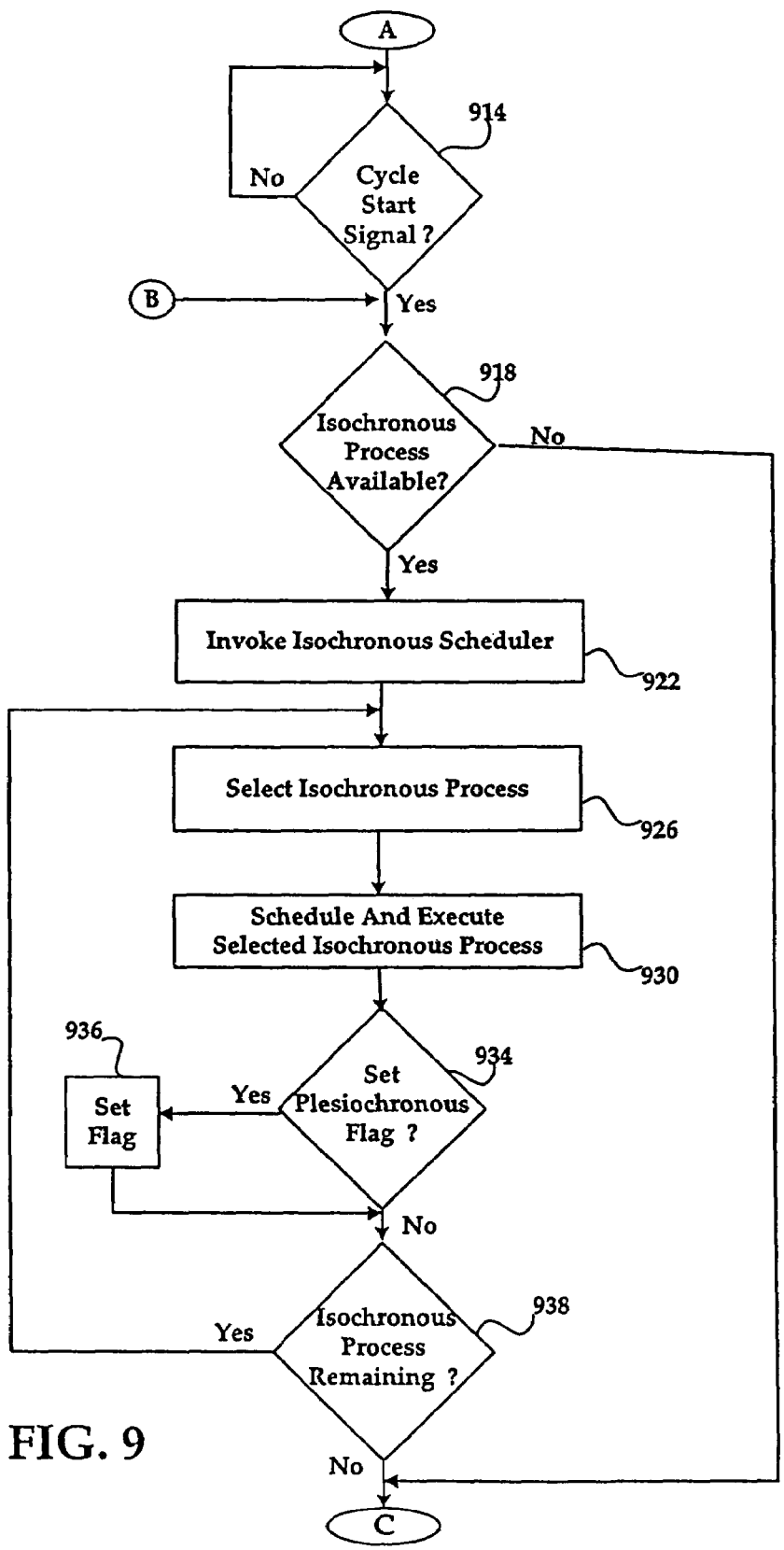
FIG. 9 is a flowchart of method steps for implementing isochronous processes in a multi-level system model, in accordance with one embodiment of the present invention.

Referring now to FIG. 9, a flowchart of method steps for implementing isochronous processes 822 in a multi-level system model is shown, in accordance with one embodiment of the present invention. The FIG. 9 example is presented for purposes of illustration, and, in alternate embodiments, the present invention may readily implement multi-level system models using various steps and sequences other than those discussed in conjunction with the FIG. 9 embodiment.

In the FIG. 9 embodiment, initially, in step 914, picokernel 314 preferably waits for a cycle start signal from isochronous clock 614 to trigger the start of an isochronous cycle. In step 918, picokernel 314 preferably determines whether any isochronous processes have been instantiated and are available for immediate scheduling and execution. Picokernel 314 may check for available isochronous processes using any appropriate technique. For example, in certain embodiments, picokernel 314 may analyze isochronous process list 514 to locate any active isochronous processes. If no active isochronous processes are available for scheduling and execution, then the FIG. 9 process advances to the following FIG. 10 plesiochronous flowchart.

However, if one or more active isochronous processes are available, then, in step 922, picokernel 314 preferably may invoke isochronous scheduler 512. In response, in step 926, isochronous scheduler 512 preferably may select an active isochronous process for scheduling and execution using any effective method or technique. For example, isochronous scheduler 512 may select an isochronous process based upon criteria such as the relative importance, length, function, or time-sensitivity of the various active isochronous processes. Isochronous scheduler 512 may alternately utilize a fixed pre-determined priority scheme, or may implement a rotating (round-robin) priority scheme.

In step 930, isochronous scheduler 512 preferably schedules and executes the selected isochronous process on device 112. In step 934, the foregoing isochronous process determines whether to activate a corresponding plesiochronous process by signaling the plesiochronous process in order to set a corresponding plesiochronous flag. An isochronous process may utilize any desired criteria to determine whether to set a plesiochronous flag.

For example, a given isochronous process may be associated with isochronous data movement for a particular task on device 112. A corresponding plesiochronous process may be required to processing data structures that are accumulated over multiple isochronous cycles as a result of the foregoing isochronous data movement process. The isochronous process may thus set a plesiochronous flag to activate the corresponding plesiochronous process when sufficient isochronous data has been accumulated to begin the processing procedure.

In step 938, isochronous scheduler 512 preferably determines whether any unexecuted active isochronous processes remain for scheduling and execution during the current isochronous cycle. If unexecuted active isochronous processes remain, then the FIG. 9 process returns to step 926 to sequentially select, schedule, and execute the remaining isochronous processes. However, if no unexecuted active isochronous processes remain, then the FIG. 9 process advances to the following FIG. 10 plesiochronous flowchart.

Figure 10:
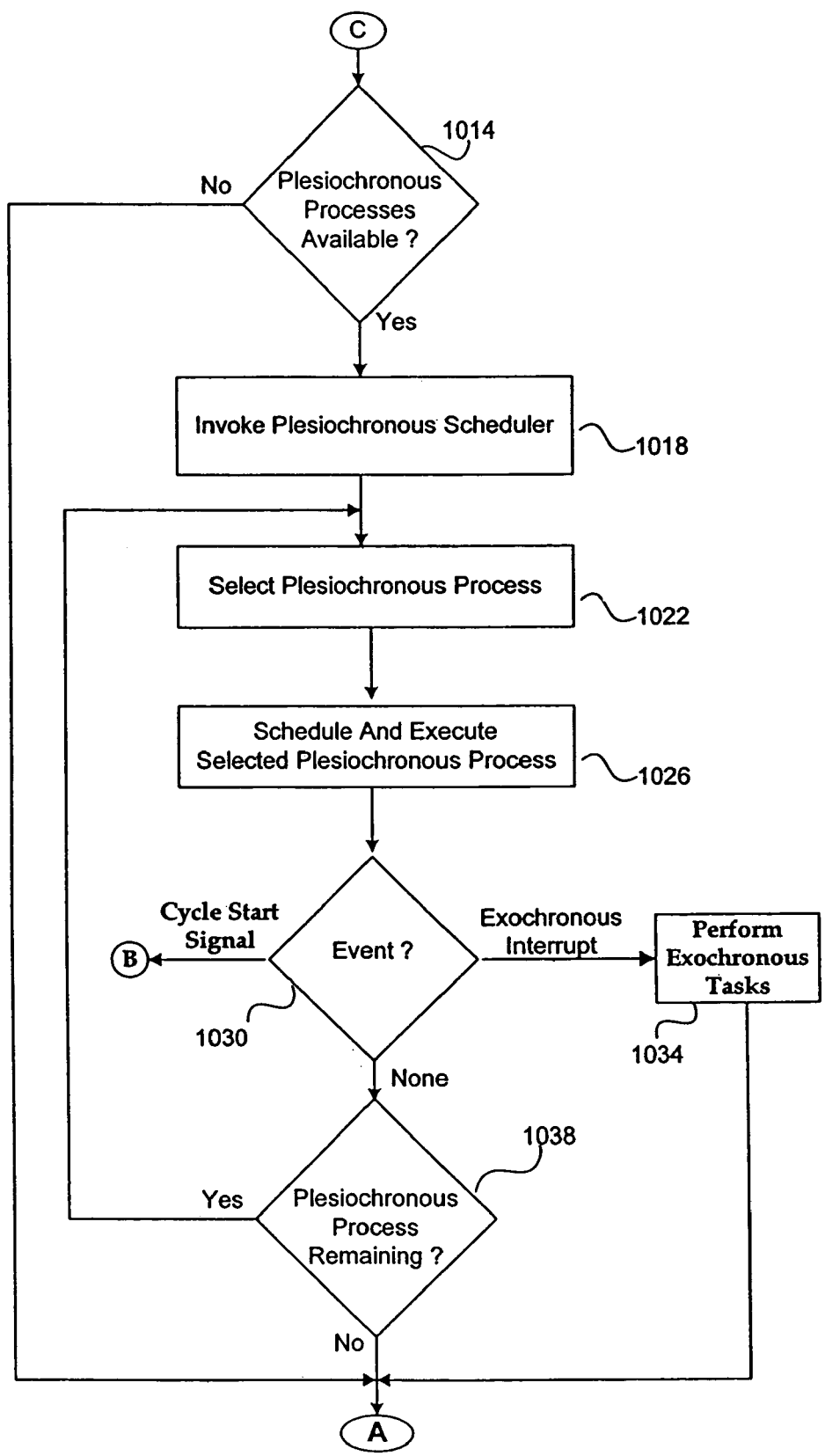
FIG. 10 is a flowchart of method steps for implementing plesiochronous processes in a multi-level system model, in accordance with one embodiment of the present invention.

Referring now to FIG. 10, a flowchart of method steps for implementing plesiochronous processes in a multi-level system model is shown, in accordance with one embodiment of the present invention. The FIG. 10 example is presented for purposes of illustration, and, in alternate embodiments, the present invention may readily implement a multi-level system model using various other steps and sequences than those discussed in conjunction with the FIG. 10 embodiment.

In the FIG. 10 embodiment, initially, in step 1014, picokernel 314 preferably determines whether any plesiochronous processes have been instantiated and have been flagged as being available for immediate scheduling and execution. Picokernel 314 may check for available plesiochronous processes using any appropriate technique. For example, in certain embodiments, picokernel 314 may analyze plesiochronous process list 518 to locate any flagged plesiochronous processes. If no flagged plesiochronous processes are available for scheduling and execution, then the FIG. 10 process returns to the beginning of the preceding FIG. 9 isochronous flowchart to wait for a subsequent cycle start signal from isochronous clock 614.

However, if one or more flagged plesiochronous processes are available, then, in step 1018, picokernel 314 preferably may invoke plesiochronous scheduler 516. In response, in step 1022, plesiochronous scheduler 516 preferably may select a flagged plesiochronous process for scheduling and execution using any effective method or technique. For example, plesiochronous scheduler 516 may select a plesiochronous process based upon criteria such as the relative importance, length, function, or time-sensitivity of the various flagged plesiochronous processes. Plesiochronous scheduler 516 may alternately utilize a fixed predetermined priority scheme, or may implement a rotating (round-robin) priority scheme. In step 1026, plesiochronous scheduler 516 preferably schedules and executes the foregoing selected plesiochronous process on device 112.

In step 1030, picokernel 314 preferably monitors device 112 for any events that may affect the execution of the current plesiochronous process. In certain embodiments, if an exochronous interrupt occurs, then picokernel 314 may preferably interrupt the currently executing plesiochronous process and mark the interrupted plesiochronous process for subsequent completion. In step 1034, device 112 may then perform various required exochronous tasks using exochronous processing 814 (FIG. 8).

Alternately, in certain embodiments, if a new cycle start signal occurs before a flagged plesiochronous process completes execution, then picokernel 314 may preferably interrupt the plesiochronous process and mark the interrupted plesiochronous process for subsequent completion. The FIG. 10 process then preferably may return to step 918 of the preceding FIG. 9 isochronous flowchart to select, schedule, and execute any active isochronous processes.

In step 1038, plesiochronous scheduler 516 preferably determines whether any unexecuted flagged plesiochronous processes remain for scheduling and execution during the current isochronous cycle. If unexecuted plesiochronous processes remain, then the FIG. 10 process returns to step 1022 to sequentially select, schedule, and execute the remaining plesiochronous processes. However, if no unexecuted plesiochronous processes remain, then the FIG. 10 process returns to the beginning of the preceding FIG. 9 isochronous flowchart to repeatedly perform the foregoing method steps in response to subsequent cycle start signals from isochronous clock 614.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An apparatus for implementing a multi-level system model, comprising:
   a picokernel configured to schedule and execute one or more selected processes in an electronic device, said one or more selected processes including an isochronous process and a plesiochronous process; and
   a processor coupled to said electronic device for controlling said picokernel, said picokernel including an isochronous scheduler and a plesiochronous scheduler, said picokernel responsively invoking said isochronous scheduler in response to an isochronous cycle start signal to thereby select, schedule, and execute active isochronous processes on said electronic device, said active isochronous processes selectively generating flags to designate active plesiochronous processes, said plesiochronous scheduler then selecting, scheduling, and executing said active plesiochronous processes when all of said active isochronous processes have been executed.

2. An apparatus for implementing a multi-level system model, comprising:
   a picokernel configured to schedule and execute one or more selected processes in an electronic device, said one or more selected processes including an isochronous process and a plesiochronous process; and a processor coupled to said electronic device for controlling said picokernel, said picokernel being stored in a memory device that also includes at least one of device software, a cantaloupe manager, one or more cantaloupes, one or more endochronous application program interfaces, one or more isochronous process representations, and one or more plesiochronous process representations, said one or more isochronous process representations and said one or more plesiochronous process representations each including one or more data structures that correspond to a respective process that has been instantiated on said electronic device, said data structures including optimized information for deterministically executing said respective process.

3. An apparatus for implementing a multi-level system model, comprising:

a picokernel configured to schedule and execute one or more selected processes in an electronic device, said picokernel detecting a cycle start signal from an isochronous clock to signify a start of an isochronous cycle, said picokernel determining whether one or more active isochronous processes are ready to be executed on said electronic device by referencing an isochronous process list, said picokernel invoking an isochronous scheduler when said one or more active isochronous processes are ready to be executed, said picokernel invoking a plesiochronous scheduler when said one or more active isochronous processes are not ready to be executed, said isochronous scheduler performing a selection procedure on said one or more active isochronous processes to produce a selected isochronous process based upon selection factors that include one of a relative process importance, a process length, a process function, and a process time-sensitivity of said isochronous process, said isochronous scheduler scheduling and executing said selected isochronous process on said electronic device, said selected isochronous process setting a plesiochronous flag to thereby designate an active plesiochronous process for scheduling and execution on said electronic device, said active isochronous process notifying said picokernel which responsively adds a corresponding plesiochronous process identifier to a plesiochronous process list; and a processor coupled to said electronic device for controlling said picokernel.

4. An apparatus for implementing a multi-level system model, comprising:

a picokernel configured to schedule and execute one or more selected processes in an electronic device, said one or more selected processes including an isochronous process and a plesiochronous process; and a processor coupled to said electronic device for controlling said picokernel, said picokernel waiting until all isochronous processes for a current isochronous cycle have been executed, said picokernel then determining whether one or more active flagged plesiochronous processes are ready to be executed on said electronic device by referencing a plesiochronous process list.

5. The apparatus of claim 4 wherein said picokernel invokes a plesiochronous scheduler when said one or more active flagged plesiochronous processes are ready to be executed, and wherein said picokernel waits for a new cycle start signal when said one or more active flagged plesiochronous processes are not ready to be executed.

6. The apparatus of claim 5 wherein said plesiochronous scheduler performs a selection procedure on said one or more active flagged plesiochronous processes to produce a selected plesiochronous process based upon selection factors that include one of a relative process importance, a process length, a process function, and a process time-sensitivity of said plesiochronous process, said plesiochronous scheduler then scheduling and executing said selected plesiochronous process on said electronic device.

7. An apparatus for implementing a multi-level system model, comprising:

a picokernel configured to schedule and execute one or more selected processes in an electronic device, said picokernel waiting until all isochronous processes for a current isochronous cycle have been executed, said picokernel then determining whether one or more active flagged plesiochronous processes are ready to be executed on said electronic device by referencing a plesiochronous process list, said picokernel invoking a plesiochronous scheduler when said one or more active flagged plesiochronous processes are ready to be executed, said picokernel waiting for a new cycle start signal when said one or more active flagged plesiochronous processes are not ready to be executed, said plesiochronous scheduler performing a selection procedure on said one or more active flagged plesiochronous processes to produce a selected plesiochronous process based upon selection factors that include one of a relative process importance, a process length, a process function, and a process time-sensitivity of said plesiochronous process, said plesiochronous scheduler then scheduling and executing said selected plesiochronous process on said electronic device, said picokernel halting said plesiochronous process and marking said plesiochronous process for a subsequent completion in response to an interrupt event, said interrupt event including one of a cycle start signal and an exochronous interrupt, said picokernel beginning a new isochronous cycle in response to said cycle start signal, said picokernel switching to an exochronous processing for executing required system tasks in response to said exochronous interrupt; and a processor coupled to said electronic device for controlling said picokernel.

8. An apparatus for implementing a multi-level system model, comprising:

a picokernel configured to schedule and execute one or more selected processes in an electronic device, said one or more selected processes including an isochronous process and a plesiochronous process; and a processor coupled to said electronic device for controlling said picokernel, said picokernel waiting until all isochronous processes for a current isochronous cycle have been executed, said picokernel then determining whether one or more active flagged plesiochronous processes are ready to be executed on said electronic device by referencing a plesiochronous process list, said picokernel invoking a plesiochronous scheduler when said one or more active flagged plesiochronous processes are ready to be executed, said picokernel waiting for a new cycle start signal when said one or more active flagged plesiochronous processes are not ready to be executed, said plesiochronous scheduler performing a selection procedure on said one or more active flagged plesiochronous processes to produce a selected plesiochronous process based upon selection factors that include one of a relative process importance, a process length, a process function, and a process time-sensitivity of said plesiochronous process, said plesiochronous scheduler then scheduling and executing said selected plesiochronous process on said electronic device, said picokernel sequentially selecting, scheduling, and executing a series of plesiochronous processes using said plesiochronous scheduler, said picokernel returning to wait for said new cycle start signal when all of said series of plesiochronous processes have been executed.

9. A computer implemented method for implementing a multi-level system model, comprising the steps of:

scheduling one or more selected processes in an electronic device by using a picokernel, said one or more selected processes including an isochronous process and a plesiochronous process;

executing said one or more selected processes by using said picokernel; and controlling said picokernel by using a processor, said picokernel including an isochronous scheduler and a plesiochronous scheduler, said picokernel responsively invoking said isochronous scheduler in response to an isochronous cycle start signal to thereby select, schedule, and execute active isochronous processes on said electronic device, said active isochronous processes selectively generating flags to designate active plesiochronous processes, said plesiochronous scheduler then selecting, scheduling, and executing said active plesiochronous processes when all of said active isochronous processes have been executed.

10. A computer implemented method for implementing a multi-level system model, comprising the steps of:

scheduling one or more selected processes in an electronic device by using a picokernel, said one or more selected processes including an isochronous process and a plesiochronous process;

executing said one or more selected processes by using said picokernel; and controlling said picokernel by using a processor, said picokernel being stored in a memory device that also includes at least one of device software, a cantaloupe manager, one or more cantaloupes, one or more endochronous application program interfaces, one or more isochronous process representations, and one or more plesiochronous process representations, said one or more isochronous process representations and said one or more plesiochronous process representations each including one or more data structures that correspond to a respective process that has been instantiated on said electronic device, said data structures including optimized information for deterministically executing said respective process.

11. A computer implemented method for implementing a multi-level system model, comprising the steps of:

scheduling one or more selected processes in an electronic device by using a picokernel, said picokernel detecting a cycle start signal from an isochronous clock to signify a start of an isochronous cycle, said picokernel determining whether one or more active isochronous processes are ready to be executed on said electronic device by referencing an isochronous process list, said picokernel invoking an isochronous scheduler when said one or more active isochronous processes are ready to be executed, said picokernel invoking a plesiochronous scheduler when said one or more active isochronous processes are not ready to be executed, said isochronous scheduler performing a selection procedure on said one or more active isochronous processes to produce a selected isochronous process based upon selection factors that include one of a relative process importance, a process length, a process function, and a process time-sensitivity of said isochronous process, said isochronous scheduler scheduling said selected isochronous process on said electronic device, said selected isochronous process setting a plesiochronous flag to thereby designate an active plesiochronous process for scheduling and execution on said electronic device, said active isochronous process notifying said picokernel which responsively adds a corresponding plesiochronous process identifier to a plesiochronous process list;

executing said one or more selected processes by using said picokernel; and controlling said picokernel by using a processor.

12. A computer implemented method for implementing a multi-level system model, comprising the steps of:

scheduling one or more selected processes in an electronic device by using a picokernel, said one or more selected processes including an isochronous process and a plesiochronous process;

executing said one or more selected processes by using said picokernel; and controlling said picokernel by using a processor, said picokernel waiting until all isochronous processes for a current isochronous cycle have been executed, said picokernel then determining whether one or more active flagged plesiochronous processes are ready to be executed on said electronic device by referencing a plesiochronous process list.

13. The method of claim 12 wherein said picokernel invokes a plesiochronous scheduler when said one or more active flagged plesiochronous processes are ready to be executed, and wherein said picokernel waits for a new cycle start signal when said one or more active flagged plesiochronous processes are not ready to be executed.

14. The method of claim 13 wherein said plesiochronous scheduler performs a selection procedure on said one or more active flagged plesiochronous processes to produce a selected plesiochronous process based upon selection factors that include one of a relative process importance, a process length, a process function, and a process time-sensitivity of said plesiochronous process, said plesiochronous scheduler then scheduling and executing said selected plesiochronous process on said electronic device.

15. A computer implemented method for implementing a multi-level system model, comprising the steps of:

scheduling one or more selected processes in an electronic device by using a picokernel, said picokernel waiting until all isochronous processes for a current isochronous cycle have been executed, said picokernel then determining whether one or more active flagged plesiochronous processes are ready to be executed on said electronic device by referencing a plesiochronous process list, said picokernel invoking a plesiochronous scheduler when said one or more active flagged plesiochronous processes are ready to be executed, said picokernel waiting for a new cycle start signal when said one or more active flagged plesiochronous processes are not ready to be executed, said plesiochronous scheduler performing a selection procedure on said one or more active flagged plesiochronous processes to produce a selected plesiochronous process based upon selection factors that include one of a relative process importance, a process length, a process function, and a process time-sensitivity of said plesiochronous process, said plesiochronous scheduler then scheduling said selected plesiochronous process on said electronic device;

executing said one or more selected processes by using said picokernel, said picokernel halting said plesiochronous process and marking said plesiochronous process for a subsequent completion in response to an interrupt event, said interrupt event including one of a cycle start signal and an exochronous interrupt, said picokernel beginning a new isochronous cycle in response to said cycle start signal, said picokernel switching to an exochronous processing for executing required system tasks in response to said exochronous interrupt; and controlling said picokernel by using a processor.

16. A computer implemented method for implementing a multi-level system model, comprising the steps of:

scheduling one or more selected processes in an electronic device by using a picokernel, said one or more selected processes including an isochronous process and a plesiochronous process;

executing said one or more selected processes by using said picokernel; and controlling said picokernel by using a processor, said picokernel waiting until all isochronous processes for a current isochronous cycle have been executed, said picokernel then determining whether one or more active flagged plesiochronous processes are ready to be executed on said electronic device by referencing a plesiochronous process list, said picokernel invoking a plesiochronous scheduler when said one or more active flagged plesiochronous processes are ready to be executed, said picokernel waiting for a new cycle start signal when said one or more active flagged plesiochronous processes are not ready to be executed, said plesiochronous scheduler performing a selection procedure on said one or more active flagged plesiochronous processes to produce a selected plesiochronous process based upon selection factors that include one of a relative process importance, a process length, a process function, and a process time-sensitivity of said plesiochronous process, said plesiochronous scheduler then scheduling and executing said selected plesiochronous process on said electronic device, said picokernel sequentially selecting, scheduling, and executing a series of plesiochronous processes using said plesiochronous scheduler, said picokernel returning to wait for said new cycle start signal when all of said series of plesiochronous processes have been executed.

* * * * *